United States Patent
Krueger et al.

(10) Patent No.: US 10,730,637 B2
(45) Date of Patent: Aug. 4, 2020

(54) INTEGRAL VANE BASE ANGLE OF ATTACK SENSOR

(71) Applicant: Rosemount Aerospace Inc., Burnsville, MN (US)

(72) Inventors: William B. Krueger, Bloomington, MN (US); Kenneth Freeman, Eagan, MN (US); Richard Alan Schwartz, Faribault, MN (US); Alexander N. Reid, St. Louis Park, MN (US); Timothy DeAngelo, Edina, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 128 days.

(21) Appl. No.: 15/720,701

(22) Filed: Sep. 29, 2017

(65) Prior Publication Data
US 2019/0100327 A1    Apr. 4, 2019

(51) Int. Cl.
*B64D 43/02*    (2006.01)
*B64D 15/12*    (2006.01)
*G01P 13/02*    (2006.01)
*G01P 5/165*    (2006.01)

(52) U.S. Cl.
CPC ............ *B64D 43/02* (2013.01); *B64D 15/12* (2013.01); *G01P 5/165* (2013.01); *G01P 13/025* (2013.01)

(58) Field of Classification Search
CPC ............ B64D 43/02; B64D 2700/6228; B64D 2700/62271; G01P 13/025
USPC ........................................................ 73/180
See application file for complete search history.

(56) References Cited

U.S. PATENT DOCUMENTS

| 3,082,622 A | * | 3/1963 | Andrew | ................ | B64D 43/02 244/181 |
| 3,208,277 A | * | 9/1965 | Hays, Jr. | ................ | B64D 43/02 73/180 |
| 3,514,997 A | * | 6/1970 | Gwathmey | ............ | B64D 43/02 244/1 R |

(Continued)

FOREIGN PATENT DOCUMENTS

CN    103410682 A    11/2013
CN    106628206 A    5/2017
(Continued)

OTHER PUBLICATIONS

Extended European Search Report for European Patent Application No. 18189480.9, dated Mar. 6, 2019, 10 pages.
(Continued)

*Primary Examiner* — Clayton E. LaBalle
*Assistant Examiner* — Kevin C Butler
(74) *Attorney, Agent, or Firm* — Kinney & Lange, P.A.

(57) ABSTRACT

An angle of attack sensor includes a housing, a heated chassis positioned at least partially within the housing and defining a pocket, a mounting plate positioned adjacent the heated chassis and having a circular opening, an external surface facing away from the housing, and an internal surface facing toward the housing, and a vane assembly extending through the circular opening of the mounting plate. The vane assembly includes a vane extending from a root to a tip and a vane base connected to the root of the vane and positioned within the pocket of the heated chassis such that the vane base is offset inwardly from the external surface toward the housing.

18 Claims, 4 Drawing Sheets

(56) References Cited

U.S. PATENT DOCUMENTS

| | | | | |
|---|---|---|---|---|
| 3,534,600 | A * | 10/1970 | Wagenknecht | B64D 43/02 73/180 |
| 3,604,259 | A * | 9/1971 | Heinsohn | B64D 43/02 73/180 |
| 3,665,760 | A * | 5/1972 | Pitches | B64D 43/02 73/170.09 |
| 3,882,721 | A * | 5/1975 | Neary | B64D 43/02 73/170.02 |
| 4,230,290 | A * | 10/1980 | Townsend | G01P 13/025 244/1 R |
| 4,390,950 | A * | 6/1983 | Muller | G05D 1/0615 244/181 |
| 4,458,137 | A | 7/1984 | Kirkpatrick | |
| 4,468,961 | A * | 9/1984 | Berg | G01P 13/025 116/265 |
| 5,062,869 | A * | 11/1991 | Hagen | G01P 5/165 96/420 |
| 5,115,237 | A * | 5/1992 | Greene | G01P 13/025 244/1 R |
| 5,438,865 | A * | 8/1995 | Greene | G01P 13/025 73/170.05 |
| 5,442,958 | A | 8/1995 | Hagen | |
| 6,070,475 | A | 6/2000 | Muehlhauser et al. | |
| 6,561,006 | B1 * | 5/2003 | Roberge | G01P 13/025 73/1.75 |
| 6,845,658 | B2 * | 1/2005 | Roberge | B64D 43/00 73/170.01 |
| 6,918,294 | B1 * | 7/2005 | Roberge | B64D 15/12 73/170.02 |
| 6,941,805 | B2 | 9/2005 | Seidel et al. | |
| 7,186,951 | B2 * | 3/2007 | Zippold | G01F 1/46 219/201 |
| 7,401,507 | B2 * | 7/2008 | Collot | B64D 43/02 73/170.01 |
| 7,597,018 | B2 * | 10/2009 | Braun | G01P 5/165 73/178 R |
| 8,397,565 | B1 * | 3/2013 | Dillon | G01F 1/46 73/170.11 |
| 10,179,654 | B2 | 1/2019 | Anderson et al. | |
| 10,197,588 | B2 | 2/2019 | Wong et al. | |
| 2003/0115948 | A1 * | 6/2003 | Rouse | G01P 5/14 73/170.02 |
| 2004/0188945 | A1 * | 9/2004 | Poincet | F16J 15/40 277/408 |
| 2004/0261518 | A1 * | 12/2004 | Seidel | B64D 43/02 73/182 |
| 2010/0116806 | A1 | 5/2010 | Hollingsworth et al. | |
| 2011/0208375 | A1 * | 8/2011 | Spoerry | G01P 5/16 701/14 |
| 2015/0082878 | A1 * | 3/2015 | Bigand | G01P 13/025 73/180 |
| 2015/0110149 | A1 * | 4/2015 | Begin-Drolet | G01N 25/04 374/16 |
| 2015/0344137 | A1 * | 12/2015 | Bartz | G01P 13/025 219/201 |
| 2016/0033356 | A1 * | 2/2016 | DeAngelo | G01M 3/40 324/694 |
| 2016/0356175 | A1 * | 12/2016 | Waddington | G01P 5/06 |
| 2017/0199218 | A1 * | 7/2017 | Benning | G01P 21/00 |
| 2018/0079525 | A1 * | 3/2018 | Krueger | B64D 43/00 |
| 2018/0136249 | A1 * | 5/2018 | Krueger | G01P 13/025 |
| 2019/0056424 | A1 * | 2/2019 | Alcaya | G01F 1/6842 |
| 2019/0056425 | A1 * | 2/2019 | Reid | G01P 13/025 |
| 2019/0100327 | A1 * | 4/2019 | Krueger | G01P 13/025 |
| 2019/0301949 | A1 | 10/2019 | Gordon et al. | |

FOREIGN PATENT DOCUMENTS

| | | | |
|---|---|---|---|
| EP | 0932831 B1 | 2/2004 | |
| EP | 1980860 A2 | 10/2008 | |
| EP | 2950106 | * 12/2015 | ............. G01P 13/02 |
| EP | 2950106 A1 | 12/2015 | |
| GB | 2039676 A | 8/1980 | |

OTHER PUBLICATIONS

Extended European Search Report for European Patent Application No. 18189469.2, dated Jan. 21, 2019, 7 pages.
Extended European Search Report for European Patent Application No. 18189477.5, dated Jan. 21, 2019, 10 pages.
Communication pursuant to Article 94(3) EPC for European Patent Application No. 18189480.9, dated Nov. 11, 2019, 4 pages.

* cited by examiner

INTEGRAL VANE BASE ANGLE OF ATTACK SENSOR

BACKGROUND

The present disclosure relates to sensors, and in particular, to angle of attack sensors.

Angle of attack sensors with rotatable vanes are installed on sides of aircraft to measure the aircraft angle of attack, the angle between oncoming airflow and the aircraft zero line (a reference line of the aircraft, such as a chord of a wing of the aircraft). The angle of attack sensor is mounted to the aircraft such that the rotatable vane protrudes outside the aircraft and is exposed to oncoming airflow. Aerodynamic forces acting on the rotatable vane cause the vane to align with the direction of the oncoming airflow. Rotational position of the vane is sensed and used to determine the aircraft angle of attack.

Angle of attack sensors with rotatable vanes often include a vane base to which the vane attaches and a rotational interface, or slinger, surrounding the vane base. The joint between the vane base and slinger can catch sand, dirt, debris, and other contamination. Additionally, ice and fluid particles in the oncoming airflow can cause ice accretion on the vane base and the slinger, which can interfere with the free rotation and aerodynamic characteristics of the vane. As a result, the angle of attack sensor may generate less accurate measurements.

SUMMARY

An angle of attack sensor includes a housing, a heated chassis positioned at least partially within the housing and defining a pocket, a mounting plate positioned adjacent the heated chassis and having a circular opening, an external surface facing away from the housing, and an internal surface facing toward the housing, and a vane assembly extending through the circular opening of the mounting plate. The vane assembly includes a vane extending from a root to a tip and a vane base connected to the root of the vane and positioned within the pocket of the heated chassis such that the vane base is offset inwardly from the external surface toward the housing.

A vane assembly for an angle of attack sensor having a housing, a heated chassis positioned at least partially within the housing and defining a pocket, and a mounting plate positioned adjacent the heated chassis and having a circular opening, an external surface facing away from the housing, and an internal surface facing toward the housing includes a vane extending from a root to a tip and a vane base connected to the root of the vane and configured to be positioned within the pocket of the heated chassis. The vane base includes a body defining a face and an end stop extending radially out of the body, the end stop being adjacent an inner radial surface of the pocket.

DETAILED DESCRIPTION

In general, the present disclosure describes an angle of attack sensor having an integral vane base, rather than a separate vane base and rotating interface, or slinger, and being positioned below flush with the mounting plate. As a result, the joint between the vane base and slinger, which catches sand, dirt, debris, and other contamination, is eliminated. Airflow glides over the integral vane base, reducing ice accretion. Further, the vane and the vane-to-shaft joint are structurally superior, the heat flow is improved, and the angle of attack sensor requires fewer parts.

Figure 1:
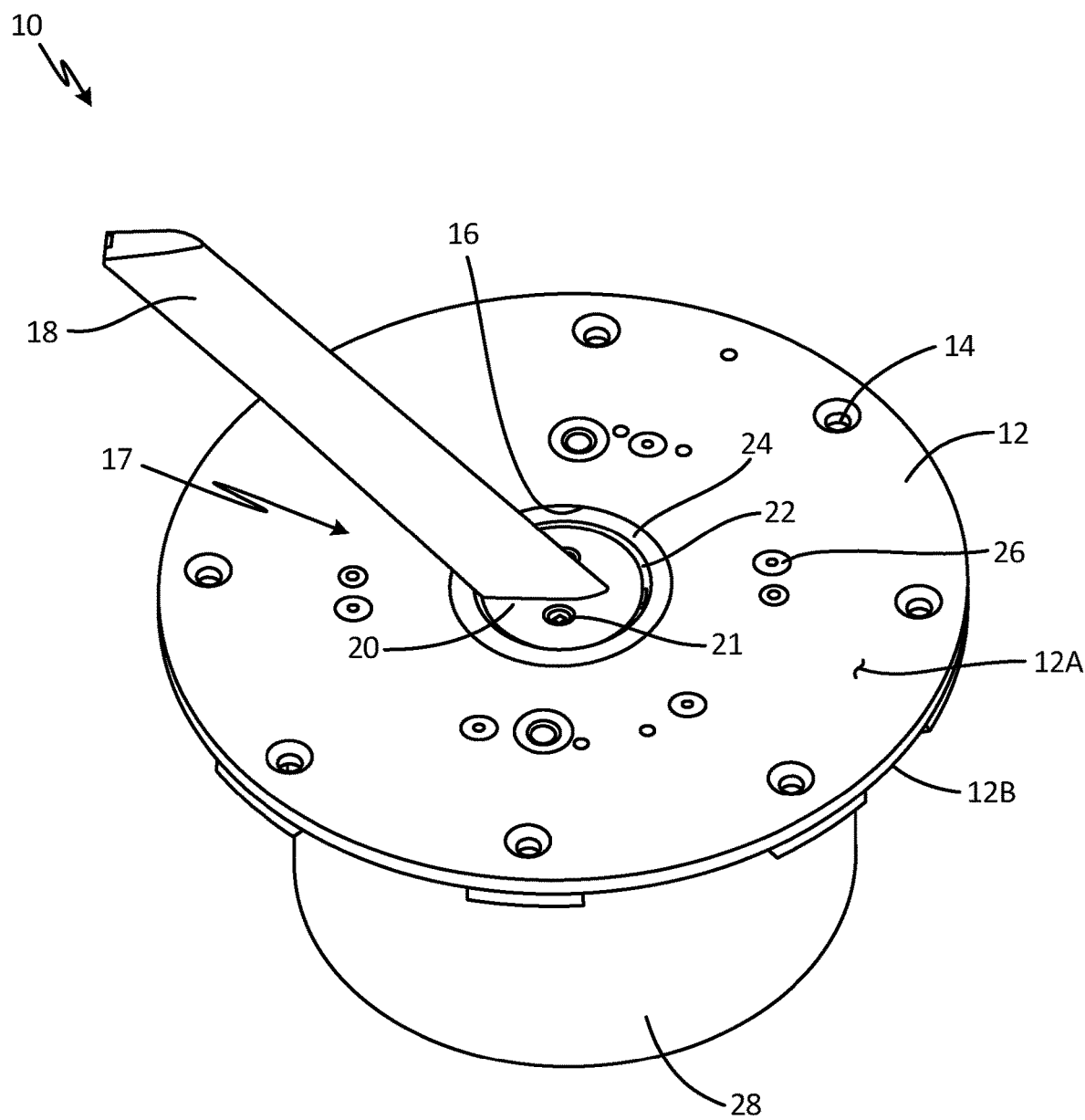
FIG. 1 is a perspective top view of an angle of attack sensor.

FIG. 1 is a perspective top view of angle of attack sensor 10. Angle of attack sensor 10 includes mounting plate 12, having an external surface 12A and an internal surface 12B, mounting holes 14, opening 16, vane assembly 17 (which includes vane 18 and integral vane base 20), shaft connectors 21, annular gap 22, heated chassis 24, fasteners 26, and housing 28.

Mounting plate 12 has mounting holes 14 located around a periphery of mounting plate 12. Mounting holes 14 extend through mounting plate 12 from external surface 12A to internal surface 12B. In this embodiment, mounting plate has eight mounting holes 14. Mounting plate 12 has circular opening 16 at its center. Vane assembly 17, which includes vane 18 and integral vane base 20, extends through opening 16 of mounting plate 12. More specifically, vane 18 extends through opening 16 of mounting plate 12 such that a first end of vane 18 is below flush with, or offset inwardly from, external surface 12A of mounting plate 12, and a second end of vane 18 is outward from external surface 12A of mounting plate 12. Integral vane base 20 is connected to the first end of vane 18. Vane 18 and integral vane base 20 may be machined out of one piece. Integral vane base 20 is radially inward from opening 16 and is below flush with, or offset inwardly from, external surface 12A of mounting plate 12. Integral vane base 20 does not extend through opening 16. Integral vane base 20 receives shaft connectors 21. Shaft connectors 21 extend all of the way through integral vane base 20.

Annular gap 22 is adjacent integral vane base 20. Annular gap 22 is a space that surrounds integral vane base 20. Mounting plate 12 is adjacent heated chassis 24 and positioned on heated chassis 24. A portion of heated chassis 24 also extends into opening 16 of mounting plate 12 such that opening 16 extends around the portion of heated chassis 24. An external surface of the portion of heated chassis 24 is flush with external surface 12A of mounting plate 12. As such, integral vane base 20 is also below flush with, or offset inwardly from, the external surface of the portion of heated chassis 24 that extends into opening 16. The portion of heated chassis 24 that extends into opening 16 of mounting plate 12 is also adjacent annular gap 22. More specifically, heated chassis 24 surrounds annular gap 22. As such, annular gap 22 is between an outer radial surface of integral vane base 20 and an inner radial surface of heated chassis 24. Consequently, annular gap 22 acts as a representation of the boundary between parts, such as vane 18 and integral vane base 20, that rotate and parts, such as heated chassis 24 and mounting plate 12, that do not rotate. Fasteners 26 are positioned around mounting plate 12 interior to mounting holes 14. Fasteners 26 extend through mounting plate 12 into a portion of heated chassis 24 located below mounting plate 12. In this embodiment, six fasteners 26 extend through mounting plate 12. Heated chassis 24 is also positioned within and connected to an open end of housing 28. As such, mounting plate 12 is also adjacent the open end of housing 28. External surface 12A of mounting plate 12 faces away from housing 28 and internal surface 12B of mounting plate 12 faces toward housing 28.

Angle of attack sensors 10 are installed on the sides of an aircraft and mounted to the aircraft via fasteners, such as screws or bolts, and mounting holes 14 on mounting plate 12. As a result, mounting plate 12 is about flush with the skin of the aircraft and housing 28 extends within an interior of the aircraft. Fasteners 26, such as screws, fasten mounting plate 12 to heated chassis 24. Vane 18 extends outside an exterior of aircraft and is exposed to oncoming airflow, causing vane 18 and integral vane base 20 of vane assembly 17 to rotate with respect to mounting plate 12 and heated chassis 24 via a series of bearings within angle of attack sensor 10. Because integral vane base 20 is below flush with or offset inwardly from external surface 12A of mounting plate 12 toward housing 28, integral vane base 20 is not directly exposed to the oncoming airflow. Vane 18 rotates based on the angle the aircraft is flying at relative to the oncoming airflow. Shaft connectors 21 connect integral vane base 20 to a rotatable vane shaft within housing 28. Rotation of the rotatable shaft is sensed and used to measure the angle of attack or angle of ascent or descent of the aircraft.

Angle of attack sensor 10 does not include a vane base to which the vane attaches and a rotational interface, or slinger, surrounding the vane base. Rather, angle of attack sensor 10 has integral vane base 20, which is a single component. As such, angle of attack sensor 10 does not have a joint between a vane base and a slinger, and thus, less sand, dirt, debris, and other contamination is caught in angle of attack sensor 10. Further, because integral vane base 20 is below flush with mounting plate 12, integral vane base 20 is not directly exposed to oncoming airflow. Consequently, less ice accretion occurs on integral vane base 20, resulting in higher functioning of angle of attack sensor 10 to yield more accurate measurements.

Figure 2A:
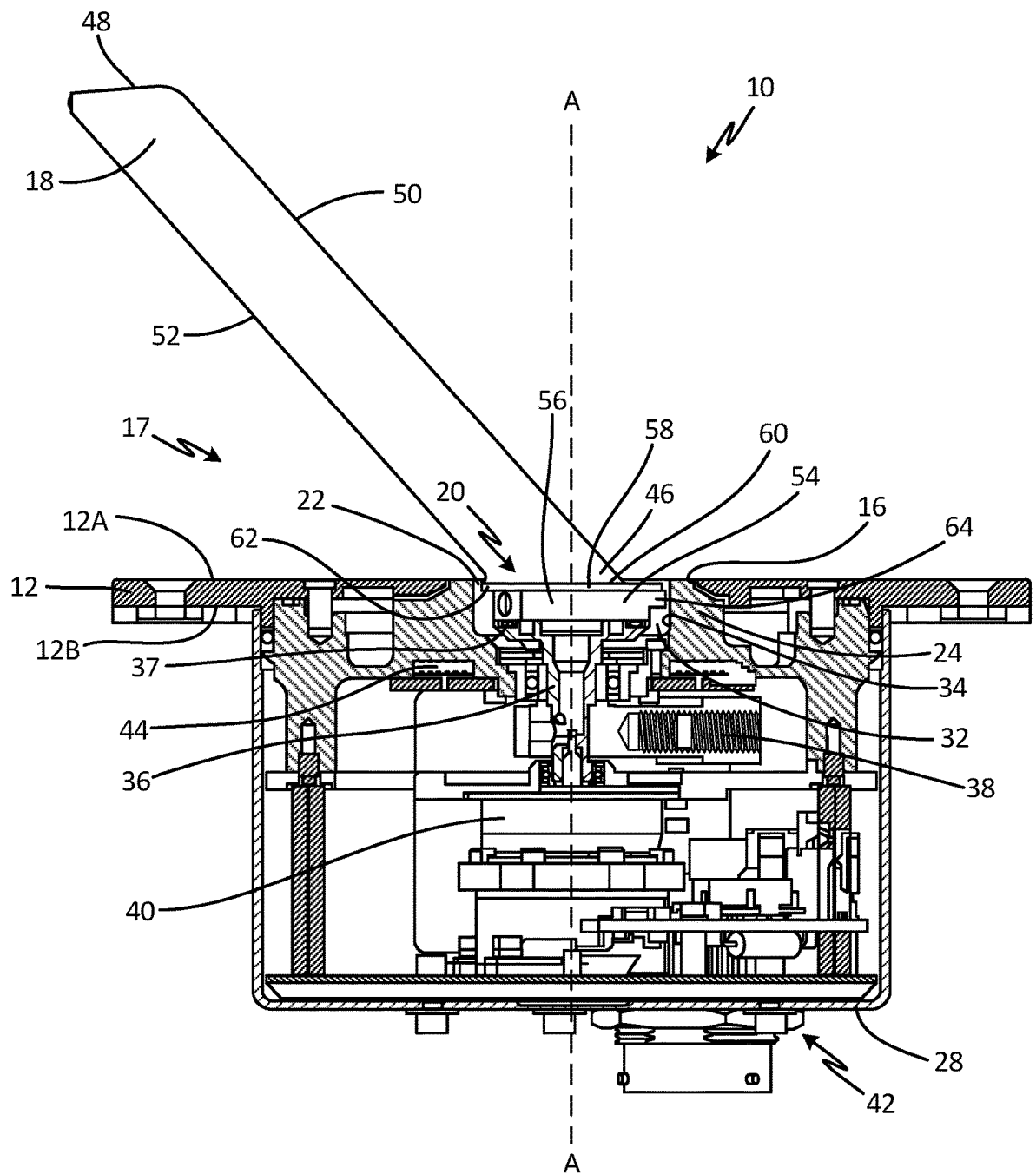
FIG. 2A is a cross-sectional side view of the angle of attack sensor.
Figure 2B:
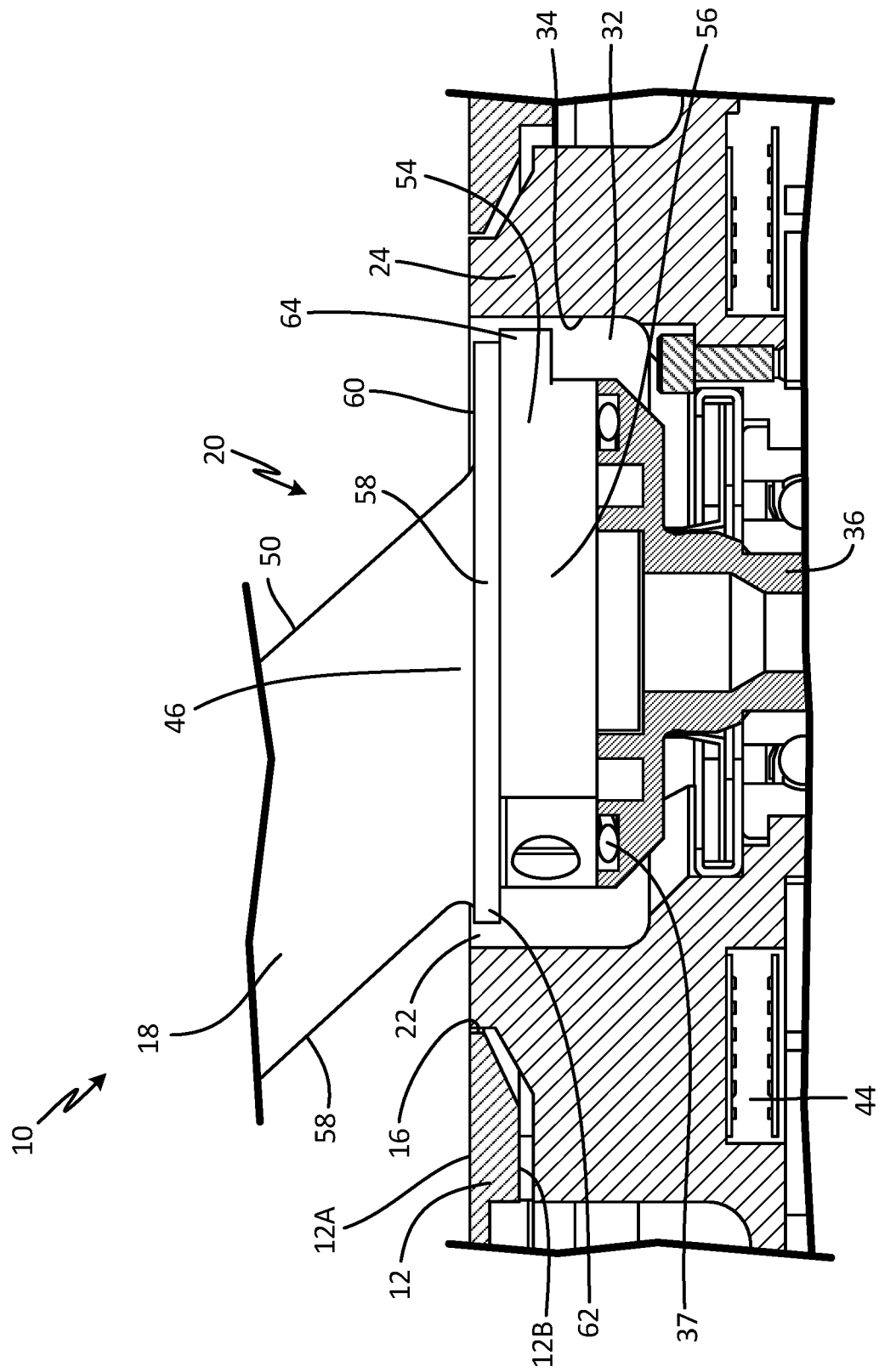
FIG. 2B is an enlarged partial cross-sectional side view of the angle of attack sensor illustrating an integral vane base within a pocket.
Figure 2C:
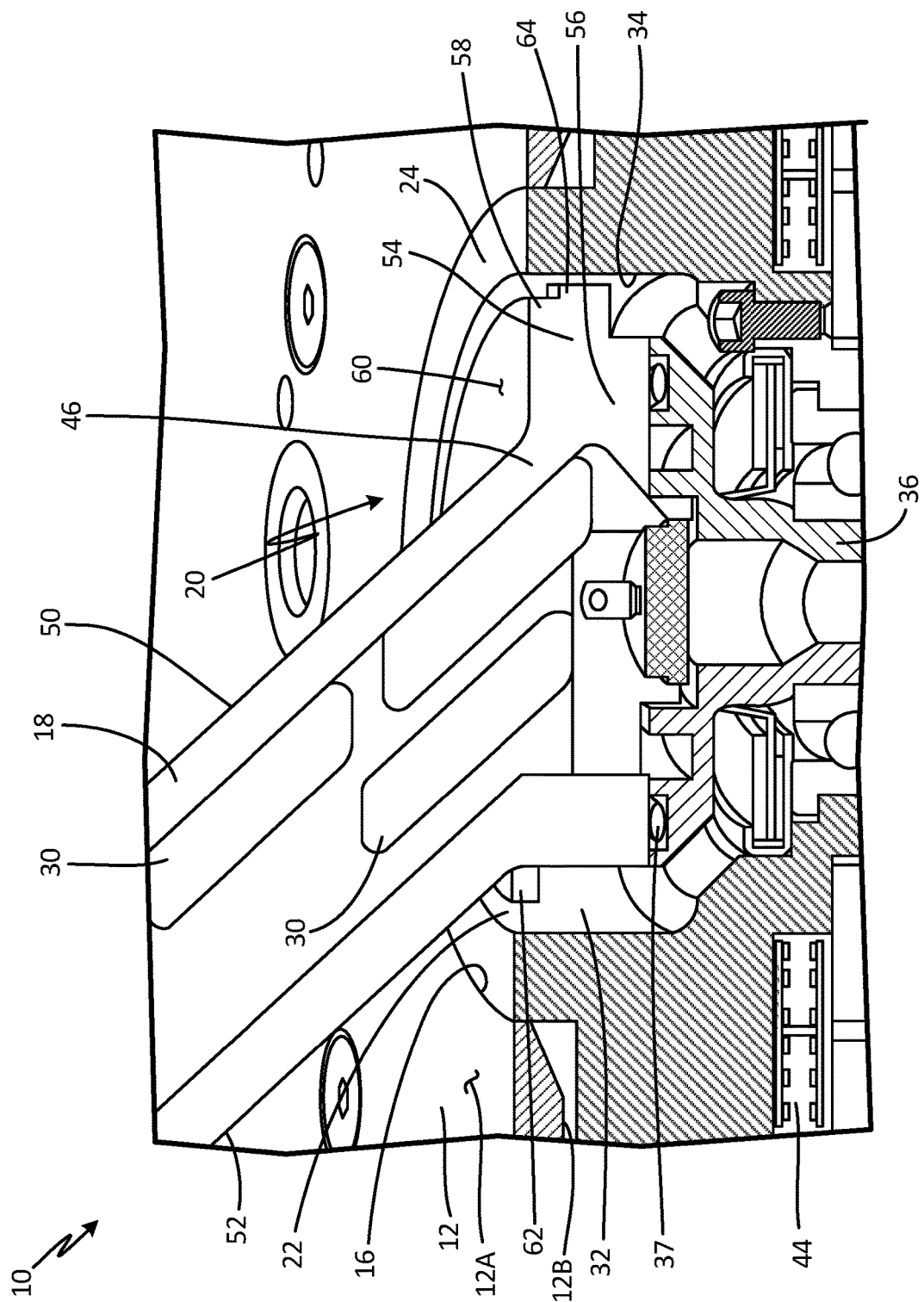
FIG. 2C is an enlarged partial cross-sectional perspective view of the angle of attack sensor illustrating heating elements in a vane.

FIG. 2A is a cross-sectional side view of angle of attack sensor 10. FIG. 2B is an enlarged partial cross-sectional side view of angle of attack sensor 10 illustrating integral vane base 20 within pocket 32. FIG. 2C is an enlarged partial cross-sectional perspective view of angle of attack sensor 10 illustrating heating elements 30 in vane 18. Vane assembly 17 is not shown in cross-section in FIGS. 2A and 2B. FIGS. 2A, 2B, and 2C will be discussed together. Angle of attack sensor 10 includes mounting plate 12, having an external surface 12A and an internal surface 12B, opening 16, vane assembly 17, which includes vane 18, integral vane base 20, and heating elements 30 (shown in FIG. 2C), annular gap 22, heated chassis 24, housing 28 (shown in FIG. 2A), pocket 32 having inner radial surface 34, vane shaft 36, o-ring 37, counterweight 38 (shown in FIG. 2A), resolver 40 (shown in FIG. 2A), electronics 42 (shown in FIG. 2A), and heater 44. Vane 18 includes root 46, tip 48 (shown in FIG. 2A), leading edge 50, and trailing edge 52. Integral vane base 20 includes body 54 having a first portion 56 and a second portion 58, face 60, rim 62, and end stop 64.

Mounting plate 12 has opening 16 at a center of mounting plate 12. Vane assembly 17 extends through opening 16 of mounting plate 12. Specifically, vane 18 of vane assembly 17 extends through opening 16 of mounting plate 12 such that a first end of vane 18 is below flush with, or offset inwardly from, external surface 12A of mounting plate 12. The first end of vane 18 is connected to integral vane base 20, and vane 18 has heating elements 30 embedded within vane 18 throughout a length of vane 18, as shown in FIG. 2C. In one embodiment, vane 18 has seven heating elements 30. Heating elements 30 may be heater chips or any other suitable heating element. Heating elements 30 extend into integral vane base 20 such that heating elements 30 are below mounting plate 12 or inward from external surface 12A toward housing 28. Integral vane base 20 is below flush with, or offset inwardly from, external surface 12A of mounting plate 12. Integral vane base 20 does not extend through opening 16. Heated chassis 24 also extends into opening 16 and is adjacent mounting plate 12.

Further, heated chassis 24 defines pocket 32, within which integral vane base 20 is positioned. Pocket 32 has annular inner radial surface 34. Pocket 32 forms annular gap 22 such that annular gap 22 exists between an outer radial surface of integral vane base 20 and inner radial surface 34 of pocket 32. A first end of vane shaft 36 extends into pocket 32 and is connected to integral vane base 20 via shaft connectors 21 (shown in FIG. 1). More specifically, shaft connectors 21 extend through integral vane base 20 to connect integral vane base 20 to vane shaft 36. Vane shaft 36 is rotatable about axis A-A. A second end of vane shaft 36 extends into housing 28. O-ring 37 is positioned in a groove in the first end of vane shaft 36 such that o-ring 37 is between integral vane base 20 and the first end of vane shaft 36. Counterweight 38 is mounted on the second end of vane shaft 36. As such, integral vane base 20, vane shaft 36, and counterweight 38 are configured to rotate together. Resolver 40 is connected to vane shaft 36 via a resolver shaft. Resolver 40 is positioned within housing 28. In alternate embodiments, resolver 40 may be any suitable rotational position sensor. Electronics 42 are positioned adjacent resolver 40 within housing 28. Electronics 42 may include circuit boards, electrical connectors, and other electronic equipment. Heater 44 is positioned on heated chassis 24. Heater 44 is annular, extending all the way around an end of heated chassis 24 that is adjacent housing 28.

Vane 18 has root 46 at a first end, with root 46 being connected to integral vane base 20. As such, root 46 of vane 18 is below flush with, or offset inwardly from, external surface 12A of mounting plate 12. Vane 18 has tip 48 at a second end. As such, tip 48 of vane 18 is outward from external surface 12A of mounting plate 12, tip 48 being exposed to oncoming airflow. Vane 18 extends from root 46 to tip 48. Leading edge 50 of vane 18 extends linearly between root 26 and tip 48 on a first side of vane 18. Trailing edge 52 of vane 18 extends linearly between root 26 and tip 48 on a second side of vane 18.

Integral vane base 20 has body 54 positioned in pocket 32 adjacent inner radial surface 34. Heating elements 30 in vane 18 extend into body 54 of integral vane base 20. Body 54 has cylindrical first portion 56 and cylindrical second portion 58. First portion 56 has a diameter equal to a diameter of a portion of vane shaft 36 that connects with first portion 56 of integral vane base 20. Second portion 58 is connected to first portion 56. In this embodiment, second portion 58 of body 54 has a larger diameter than first portion 56 of body 54. In alternate embodiments, first portion 56 and second portion 54 may have the same diameters. In this embodiment, first portion 56 of body 54 has a greater thickness than second portion 58 of body 54. In alternate embodiments, first portion 56 may be equal in thickness to second portion 58. Second portion 58 of body 54 is adjacent annular gap 22. Face 60 is defined by body 54, and face 60 is at an outer surface of second portion 58 of body 54. Thus, a periphery of face 60 is adjacent annular gap 22. Heating elements 30 extend into body 54 below face 60, which is smooth. In this embodiment, the periphery of face 60 is circular. Vane 18 connects to face 60 of integral vane base 20. The portion of second portion 58 extending over first portion 56 forms rim 62. Rim 62 is annular and adjacent annular gap 22. Rim 62 is closely spaced (about 0.09 inch or 2.286 millimeters) to inner radial surface 34 of pocket 32 in heated chassis 24. As such, annular gap 22 between integral vane base 20 and heated chassis 24 is small. In alternate embodiments, body 54 of integral vane base 20 is shaped such that integral vane base 20 does not include rim 62. End stop 64 is a tab connected to a sidewall of first portion 56 of body 54. End stop 64 extends radially out of a side of first portion 56 of body 54 such that end stop 64 is adjacent inner radial surface 34 of pocket 32. End stop 34 is configured to mate with a tab extending out of inner radial surface 34 of pocket 32. Integral vane base 20 may be machined out of a single piece of material.

External surface 12A of mounting plate 12 is exposed at an exterior of an aircraft. Vane 18 also extends outside the exterior of the aircraft and is exposed to oncoming airflow. Oncoming airflow causes vane assembly 17, including vane 18 and integral vane base 20, to rotate with respect to mounting plate 12 and heated chassis 24 about axis A-A. Rotation of integral vane base 20 causes rotation of vane shaft 36. Resolver 40 is configured to sense rotation of vane shaft 36 to generate angle of attack readings. Counterweight 38 is mounted on vane shaft 36 to counterbalance vane 18. O-ring 37 impedes water ingress between integral vane base 20 and vane shaft 36 from pocket 32. Electronics 50 power electronic components of angle of attack sensor 10, such as resolver 40, heating elements 30, and heaters 44. Heating elements 30 warm vane 18 and integral vane base 20, particularly heating elements 30 closest to integral vane base 20. As such, heating elements 30 keep vane 18 and integral vane base 20 above freezing, and therefore free from ice. Heating elements 30 also assist in evaporating trapped water out of angle of attack sensor 10, preventing the water from causing damage to electronic components. Heaters 42 heat heated chassis 24, keeping pocket 32 warm. Thus, heaters 42 also assist in keeping integral vane base 20 from freezing. Heating elements 30 and heaters 42 can serve as back-up heat sources to one another so that if, for example, heaters 42 become non-functional, heating elements 30 can keep vane assembly 17 ice-free and functional. End stop 64 limits rotation of vane assembly 17. For example, end stop 64 stops vane assembly 17 from rotating by mating or colliding with a tab extending out of inner radial surface 34 of pocket 32.

Traditionally, an angle of attack sensor has a separate vane base attached to a separate rotating interface, or slinger. The trailing edge of the vane includes an undercut to allow for assembly of the slinger. The vane base and rotating interface protrude out past the skin of the aircraft where they come into contact with airflow. Sand, dirt, debris, and other contamination can get caught in the joint between the vane base and slinger. Additionally, fluid or ice particles in the airflow can cause ice accretion on the vane base and the slinger, which can interfere with the free rotation and aerodynamic characteristics of the vane, resulting in less accurate measurements. Direct contact with the airflow also cools the vane assembly more quickly. Further, angle of attack sensors often use counterweights and other internal features to stop the vane or prevent the vane from moving past a certain angle, which can be problematic. Certain interfaces of the internal features can be stressed and displaced or damaged from being hit by the counterweight. Consequently, the vane may not rotate properly and angular error may result.

Integral vane base 20 is a single component that connects vane 18 and vane shaft 36, yielding a more rigid and higher strength structural connection and improved electrical bonding between vane 18 and vane shaft 36. Integral vane base 20 has smooth face 60 and does not include a joint between a vane base and a rotating interface (or slinger) that catches sand, dirt, debris, and other contamination that can interfere with the functionality of angle of attack sensor 10. Integral vane base 20 also allows for trailing edge 52 to extend linearly between root 46 and tip 58 of vane 18, eliminating an undercut and achieving a structurally stiffer and stronger vane 18. Further, angle of attack sensor 10 includes fewer parts, simplifying assembly part count. Integral vane base 20 is also smaller than a separate vane base and slinger, which means integral vane base 20 is lighter and has less exposed surface area so less heat is required to keep integral vane base 20 above freezing. Additionally, because integral vane base 20 is a single component, integral vane base 20 is easier to manufacture.

Moreover, integral vane base 20 is positioned below flush with, or offset inwardly from, external surface 12A of mounting plate 12 and does not protrude directly into the oncoming airflow. As such, integral vane base 20 is not directly exposed to cold airflow or the water and ice particles in the airflow. Consequently, convective heat loss from face 60 of integral vane base 20 is reduced and ice accretion on integral vane base 20 is reduced. Further, a below flush integral vane base 20 allows heating elements 30 in vane assembly 17 to be positioned below mounting plate 12 and face 60 and further into body 54, better trapping in heat. Because the heat is further away from the oncoming airflow, the heat is less likely to move away with the oncoming airflow. As a result, integral vane base 20 has a higher operating temperature and superior anti-icing capabilities, preventing vane 18 and integral vane base 20 from freezing in place and becoming dysfunctional. Annular gap 22 between integral vane base 20 and heated chassis 24 is small to prevent foreign objects and contamination such as sand or dust from entering pocket 32.

Vane assembly 17 incorporates end stop 64 into integral vane base 20 and uses end stop 64 in conjunction with a tab extending out of inner radial surface 34 of pocket 32 to stop vane assembly 17 from rotating rather than using counterweights and other internal features of angle of attack sensor 10. As a result, end stop 64 prevents displacement and damage to the interfaces of the other internal features. Consequently, vane 18 may rotate properly without angular error and components of angle of attack sensor 10 require less replacement.

Discussion of Possible Embodiments

The following are non-exclusive descriptions of possible embodiments of the present invention.

An angle of attack sensor comprising: a housing; a heated chassis positioned at least partially within the housing and defining a pocket; a mounting plate positioned adjacent the heated chassis and having a circular opening, an external surface facing away from the housing, and an internal surface facing toward the housing; and a vane assembly extending through the circular opening of the mounting plate, the vane assembly including: a vane extending from a root to a tip; and a vane base connected to the root of the vane and positioned within the pocket of the heated chassis such that the vane base is offset inwardly from the external surface toward the housing.

The angle of attack sensor of the preceding paragraph can optionally include, additionally and/or alternatively, any one or more of the following features, configurations and/or additional components:

The vane base includes: a body defining a face; and an end stop extending radially out of the body, the end stop being adjacent an inner radial surface of the pocket.

An annular gap exists between an outer radial surface of the vane base and an inner radial surface of the pocket.

A portion of the heated chassis extends into the opening of the mounting plate toward the external surface of the mounting plate such that it is flush with the external surface of the mounting plate.

The vane base is offset inwardly toward the housing from an external surface of the portion of the heated chassis.

The end stop is configured to limit rotation of the vane assembly.

The root of the vane is offset inwardly from the external surface of the mounting plate toward the housing.

The root of the vane is connected to the vane base at a face of the vane base.

The vane assembly is configured to rotate with respect to the mounting plate.

The vane base is connected to a vane shaft.

The vane shaft is connected to a counterweight.

The vane assembly further includes heating elements within the vane.

The heating elements in the vane extend into a body of the vane base and inward from the external surface of the mounting plate toward the housing.

The vane includes a trailing edge that extends linearly between the root of the vane and the tip of the vane, the root of the vane being connected to a face of the vane base.

Shaft connectors extend through the vane base.

A vane assembly for an angle of attack sensor, the angle of attack sensor having a housing, a heated chassis positioned at least partially within the housing and defining a pocket, and a mounting plate positioned adjacent the heated chassis and having a circular opening, an external surface facing away from the housing, and an internal surface facing toward the housing, the vane assembly comprising: a vane extending from a root to a tip; and a vane base connected to the root of the vane and configured to be positioned within the pocket of the heated chassis, the vane base including: a body defining a face; and an end stop extending radially out of the body, the end stop being adjacent an inner radial surface of the pocket.

The vane assembly of the preceding paragraph can optionally include, additionally and/or alternatively, any one or more of the following features, configurations and/or additional components:

The vane base is positioned within the pocket of the heated chassis such that the vane base is offset inwardly from the external surface toward the housing.

An annular gap between an outer radial surface of the vane base and an inner radial surface of the pocket of the heated chassis.

The root of the vane is connected to the vane base at the face of the vane base.

The end stop is configured to limit rotation of the vane assembly.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An angle of attack sensor comprising:
   a housing;
   a heated chassis positioned at least partially within the housing and defining a pocket;
   a mounting plate positioned on the heated chassis and having a circular opening, an external surface facing away from the housing, and an internal surface facing toward the housing; and
   a vane assembly extending through the circular opening of the mounting plate, the vane assembly including:
      a vane extending from a root to a tip; and
      a vane base having a body with a cylindrical portion, the body defining a face at an outer surface of the body, wherein the root of the vane is connected to the face of the vane base, and the vane base is positioned within the pocket of the heated chassis such that the face of the vane base is offset inwardly from the external surface of the mounting plate toward the housing.

2. The angle of attack sensor of claim 1, wherein the vane base includes:
   an end stop extending radially out of the body, the end stop being adjacent an inner radial surface of the pocket.

3. The angle of attack sensor of claim 2, wherein the end stop is configured to limit rotation of the vane assembly.

4. The angle of attack sensor of claim 1, wherein an annular gap exists between an outer radial surface of the vane base and an inner radial surface of the pocket.

5. The angle of attack sensor of claim 1, wherein a portion of the heated chassis extends into the opening of the mounting plate toward the external surface of the mounting plate such that it is flush with the external surface of the mounting plate.

6. The angle of attack sensor of claim 5, wherein the vane base is offset inwardly toward the housing from an external surface of the portion of the heated chassis.

7. The angle of attack sensor of claim 1, wherein the root of the vane is offset inwardly from the external surface of the mounting plate toward the housing.

8. The angle of attack sensor of claim 1, wherein the vane assembly is configured to rotate with respect to the mounting plate.

9. The angle of attack sensor of claim 1, wherein the vane base is connected to a vane shaft.

10. The angle of attack sensor of claim 9, wherein the vane shaft is connected to a counterweight.

11. The angle of attack sensor of claim 1, wherein the vane assembly further includes heating elements within the vane.

12. The angle of attack sensor of claim 11, wherein the heating elements in the vane extend into a body of the vane base and inward from the external surface of the mounting plate toward the housing.

13. The angle of attack sensor of claim 1, wherein the vane includes a trailing edge that extends linearly between the root of the vane and the tip of the vane.

14. The angle of attack sensor of claim 1, wherein shaft connectors extend through the vane base.

15. A vane assembly for an angle of attack sensor, the angle of attack sensor having a housing, a heated chassis positioned at least partially within the housing and defining a pocket, and a mounting plate positioned adjacent the heated chassis and having a circular opening, an external surface facing away from the housing, and an internal surface facing toward the housing, the vane assembly comprising:

a vane extending from a root to a tip; and a vane base connected to the root of the vane and configured to be positioned within the pocket of the heated chassis, the vane base including:

a body having a cylindrical portion, the body defining a face at an outer surface of the body, wherein the root of the vane is connected to the face of the vane base; and an end stop extending radially out of a sidewall of the body, the end stop being adjacent an inner radial surface of the pocket.

16. The vane assembly of claim 15, wherein the vane base is positioned within the pocket of the heated chassis such that the vane base is offset inwardly from the external surface toward the housing.

17. The vane assembly of claim 15, further including an annular gap between an outer radial surface of the vane base and an inner radial surface of the pocket of the heated chassis.

18. The vane assembly of claim 15, wherein the end stop is configured to limit rotation of the vane assembly.

\* \* \* \* \*